(12) United States Patent
Riahi

(10) Patent No.: US 10,692,335 B2
(45) Date of Patent: Jun. 23, 2020

(54) GREEN DRIVE WITH STATUS INDICATOR

(71) Applicant: SEAGATE TECHNOLOGY LLC, Cupertino, CA (US)

(72) Inventor: Aliasghar Riahi, Orinda, CA (US)

(73) Assignee: Seagate Technology LLC, Fremont, CA (US)

(*) Notice: Subject to any disclaimer, the term of this patent is extended or adjusted under 35 U.S.C. 154(b) by 25 days.

(21) Appl. No.: 14/641,033

(22) Filed: Mar. 6, 2015

(65) Prior Publication Data

US 2016/0042176 A1    Feb. 11, 2016

Related U.S. Application Data

(63) Continuation-in-part of application No. 14/456,907, filed on Aug. 11, 2014, now Pat. No. 10,133,486.

(51) Int. Cl.
| | |
|---|---|
| *G06F 21/50* | (2013.01) |
| *G08B 5/36* | (2006.01) |
| *G06F 21/57* | (2013.01) |
| *G06F 21/60* | (2013.01) |

(52) U.S. Cl.
CPC ............ *G08B 5/36* (2013.01); *G06F 21/57* (2013.01); *G06F 21/60* (2013.01); *G06F 2221/034* (2013.01); *G06F 2221/2107* (2013.01); *G06F 2221/2143* (2013.01)

(58) Field of Classification Search
CPC .................................. G06F 21/60; G08B 5/36
See application file for complete search history.

(56) References Cited

U.S. PATENT DOCUMENTS

| 6,532,548 B1 | 3/2003 | Hughes | |
|---|---|---|---|
| 6,968,459 B1 * | 11/2005 | Morgan | ............ G06F 12/1408 |
| | | | 711/E12.092 |
| 7,139,027 B1 * | 11/2006 | Fredlund | .................. G09G 3/16 |
| | | | 348/231.7 |
| 8,296,545 B2 | 10/2012 | Estakhri et al. | |
| 9,116,905 B1 | 8/2015 | Harwood et al. | |

(Continued)

OTHER PUBLICATIONS

Wilson, M., Western Digital My Passport Studio Drives, Now With E-Paper, http://gizmodo.com/5482721/western-digital-my-passport-studio-drives-now-with-e-paper, Mar. 1, 2010, (4 pp.).

*Primary Examiner* — Charles Rones
*Assistant Examiner* — Tian-Pong Chang
(74) *Attorney, Agent, or Firm* — Faegre Drinker Biddle & Reath LLP

(57) ABSTRACT

Methods, systems, and devices are described for displaying information on a visual display of a data storage device. The device may be an internal data storage device and may display information associated with various operation parameters and a security confidence metric or states of the data storage device. The data storage device may display, on the visual display, an indication of a security confidence metric of the data storage device indicative of whether the data storage device has been compromised. The data storage device may be compromised by having one or more subcomponents replaced, altered, or misused. The visual display may be electronic paper, mechanical, or chemical such that the information is displayed without power being applied to the data storage device. The visual display may be removable from the data storage medium.

20 Claims, 8 Drawing Sheets

(56) References Cited

U.S. PATENT DOCUMENTS

| | | | |
|---|---|---|---|
| 9,430,330 B1* | 8/2016 | Bardhan | G06F 11/1448 |
| 2003/0236930 A1* | 12/2003 | Paul | G06F 11/2007 |
| | | | 710/33 |
| 2004/0257878 A1 | 12/2004 | Morikawa et al. | |
| 2005/0038566 A1* | 2/2005 | Chian | F24H 9/2035 |
| | | | 700/276 |
| 2006/0075182 A1 | 4/2006 | Hsieh et al. | |
| 2006/0227123 A1* | 10/2006 | Bychkov | H05K 5/0278 |
| | | | 345/204 |
| 2007/0003270 A1 | 1/2007 | Fredlund et al. | |
| 2007/0101058 A1 | 5/2007 | Kinnan et al. | |
| 2008/0155262 A1* | 6/2008 | Beaver | H04L 9/3263 |
| | | | 713/173 |
| 2008/0229420 A1* | 9/2008 | Jeschke | H04L 63/1433 |
| | | | 726/25 |
| 2009/0213698 A1* | 8/2009 | Ostrovsky | G04F 1/005 |
| | | | 368/10 |
| 2009/0228823 A1 | 9/2009 | Edwards et al. | |
| 2010/0082890 A1 | 4/2010 | Heo et al. | |
| 2010/0318810 A1* | 12/2010 | Strom | G06F 21/79 |
| | | | 713/190 |
| 2012/0011409 A1 | 1/2012 | Resnick | |
| 2012/0185413 A1 | 7/2012 | Felter | |
| 2012/0278564 A1* | 11/2012 | Goss | G06F 12/00 |
| | | | 711/155 |
| 2012/0281159 A1* | 11/2012 | Chen | G02F 1/1345 |
| | | | 349/40 |
| 2013/0086394 A1 | 4/2013 | Shimmitsu | |
| 2013/0187791 A1 | 7/2013 | Marcus et al. | |
| 2014/0019812 A1* | 1/2014 | Saito | G06F 11/3409 |
| | | | 714/47.1 |
| 2014/0022849 A1* | 1/2014 | Krutzik | G06F 21/80 |
| | | | 365/185.33 |
| 2014/0310536 A1* | 10/2014 | Shacham | G06F 21/78 |
| | | | 713/193 |
| 2015/0121537 A1* | 4/2015 | Ellis | G06F 21/60 |
| | | | 726/26 |
| 2015/0169231 A1* | 6/2015 | Kanigicherla | G06F 3/0611 |
| | | | 710/5 |
| 2015/0228338 A1* | 8/2015 | Manda | G11C 13/0004 |
| | | | 365/163 |
| 2016/0034226 A1 | 2/2016 | Nakaso et al. | |

\* cited by examiner

GREEN DRIVE WITH STATUS INDICATOR

CROSS REFERENCES

The present application for patent is a Continuation-in-Part of, and claims priority to U.S. Non-Provisional patent application Ser. No. 14/456,907 by Riahi et al., entitled "STATUS INDICATOR ON A DATA STORAGE DEVICE," filed Aug. 11, 2014, assigned to the assignee hereof, and expressly incorporated by reference herein.

SUMMARY

The present disclosure provides one or more improved systems, methods, and/or apparatuses for providing a status indicator on a data storage device. In some examples, a storage device may be equipped with a visual display to show one or more status indicator(s). The storage device may be an internal storage device configured to be mounted inside a host computing system, e.g., a personal computer, laptop, server, etc. The data storage device may include hardware, software, firmware, or otherwise be configured to control the information displayed on the visual display. In some examples, the display may be electronic paper ("e-paper") where the status indicator information is displayed without power being applied to the data storage device (e.g., when unplugged from the host computing system). The data storage device may determine whether the data storage device has been compromised or otherwise tampered with and display an indication on the display accordingly, e.g., a warning message to indicate that a data storage medium has been replaced, abused, etc. The storage device may also be configured to display additional information associated with various operations conditions or states of the data storage device, e.g., original conditions and/or updated conditions. The visual display may be removable from the storage device, e.g., mounted to a removable cover plate on the storage device.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
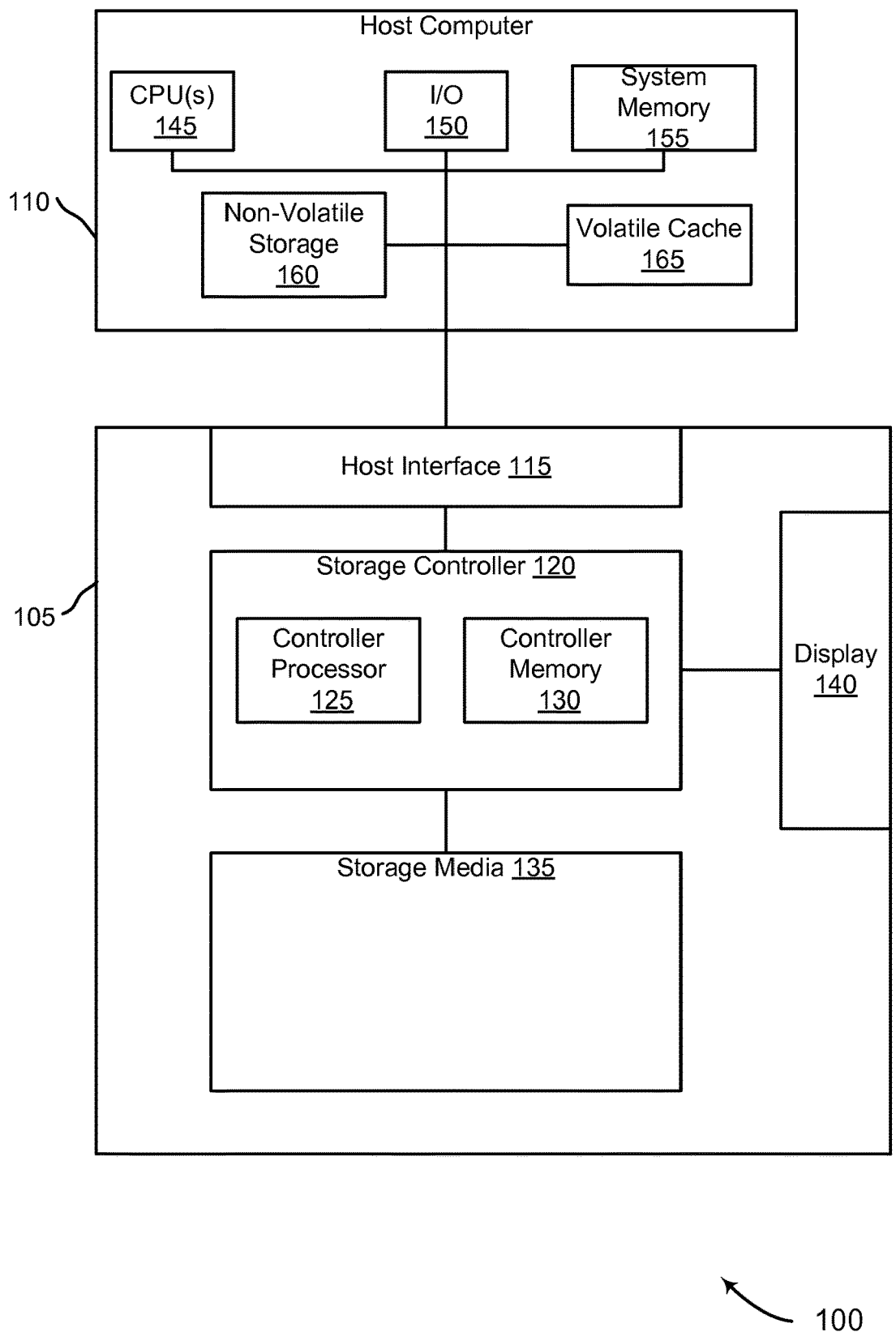
FIG. 1 is a block diagram representation of an example data storage device and host computer configured and operated in accordance with various embodiments.

The present disclosure generally relates to a visual display on a data storage device. In accordance with various embodiments, a storage device is provided with a visual display and configured to control the information being displayed. In some aspects of the present disclosure, the data storage device includes logic (e.g., firmware) that monitors one or more statuses associated with the data storage device and provides a visual indication of the statuses. As one example, the data storage device may include encryption protocols that encrypt/decrypt data being stored/retrieved, respectively, on a storage medium of the data storage device. The data storage device may be configured to securely erase the stored data by erasing or overwriting an encryption key used to secure the data, for example. The data storage device may be configured to control the information displayed on the visual indicator to convey confirmation or an indication that the data storage device has been securely erased. The display may be e-paper, for example, such that the visual indicator may convey the confirmation regardless of whether power is applied to the data storage device. Accordingly, an operator may determine whether the data storage device is secured based on the displayed information.

In some examples, the visual display may be removable and, in some aspects, reusable. For example, the visual display may be mounted on a cover plate of the storage device where the cover plate is removable. Additionally or alternatively, the visual display me be removable from the data storage device, e.g., removable from a cover plate of the data storage device. When removed, the visual display may continue to display the information associated with the data storage device including, but not limited to, various operational parameters of the data storage device, identification information associated with the data storage device, and the like. In some examples, the data storage device may provide for an indication of whether one or more aspects of the data storage device has been compromised or otherwise tampered with, e.g., whether a data storage medium has been removed, replaced, etc. When it is determined that the data storage device has been compromised, the data storage device may cause a message (e.g., a warning message) to be displayed on the visual display indicative of such compromise. A user, technician, manufacturer, etc., of the data storage device may readily determine one or more aspects associated with the data storage device and respond accordingly, e.g., determine whether the data storage device is original, has been tampered with such to void a warranty, etc.

Various examples described herein are made in reference to solid state drives (SSD), which generally include non-volatile solid-state memory, which may exhibit faster data transfer performance than a traditional hard disk drive (HDD) having rotating magnetic media. Such devices can be used as standalone replacement for an HDD and/or as a cache for an HDD. One difference between, e.g., an SSD and an HDD, is that the memory cells of an SSD have a finite life, measured as a function of number of erase/write cycles applied the memory cells. While an HDD may also exhibit wear (e.g., mechanical wear) that limits life of the device, the magnetic disks that are used as data storage media are not considered to be life-limited based on the number of erase/write cycles applied. It is to be understood, however, that the present disclosure is not limited to a SSD having a visual display and, instead, the visual display may be incorporated into a traditional HDD in accordance with various embodiments. In some embodiments, the data storage device is an internal drive configured to be mounted inside a host computing system.

With reference now to FIG. 1, a block diagram illustrates a system 100 having a non-volatile solid-state memory apparatus 105 (such as an SSD) according to various examples of the present disclosure. The example apparatus 105 is configured as an SSD, in which data from host computer 110 is received at the apparatus 105, encrypted, and stored. The apparatus 105 may be any type of persistent solid-state storage device, including an SSD, thumb drive, memory card, embedded device storage, etc. As discussed, the apparatus 105 may also be a traditional HDD. The system 100 may include a host interface 115 that facilitates communications between the apparatus 105 and the host computer 110.

The apparatus 105 of this example includes one or more storage controllers 120, which may include a controller processor 125, which may be a general-purpose or special-purpose processor that performs operations of the apparatus 105. The storage controller 120 may include any combination of microprocessors, digital signal processor (DSPs), application specific integrated circuits (ASICs), field programmable gate arrays (FPGAs), or other equivalent integrated or discrete logic circuitry suitable for performing the various functions described herein. The controller processor 125 may be in communication with a controller memory 130, which may store computer readable code that may be executed by the controller processor 125 to perform various operations of the apparatus 105. In some examples, as will be described in more detail below, the controller memory 130 includes non-volatile memory that may store a portion of an encryption key used to encrypt data stored in storage media 135. In some examples, the controller memory 130 may also store one or more parameters associated with the apparatus 105 and used for determining a security metric for the apparatus 105 indicative of whether there has been any tampering, compromise, etc.

The apparatus 105 may also include a display 140 in communication with the storage controller 120. The display 140 may be a static display in that the information may be displayed without power applied. In some examples, the display 140 may be an electronic paper or electronic ink (commonly referred to as "e-paper") display. The display 140 may be a black and white display or a color display. The display 140 may be flat and/or curved. In some examples, the display 140 is positioned on the outside of a SSD and/or a HDD and placed in a location to be readily visible when viewing the SSD/HDD. In some examples, the display 140 may be removable so as to be separable from the apparatus 105.

In some examples, the display 140 is positioned on an internal SSD/HDD, i.e., a storage device that is mounted inside a host computing system during normal use. As would be appreciated, the display 140 mounted internally may not be visible during daily use. However, aspects of the storage controller 120 may monitor various conditions associated with the apparatus 105, e.g., secure erase status, sensor(s) status, error conditions, life cycle, etc., and cause information associated with the monitored condition to be displayed on the display 140. The storage controller 120 may also monitor and determine whether the apparatus 105 has been compromised or tampered with, e.g., by confirming identification numbers are original, etc. Accordingly, a technician removing the apparatus 105 from the computing system (also removing power) may view the display 140 to determine the various conditions. As one example, the technician may immediately know if the storage media 135 has been securely erased using an instant secure erase (ISE) function, discussed in more detail below. As another example, the technician and/or manufacturer may readily determine whether the apparatus 105 has been compromised or mistreated, thereby possibly voiding a warranty for the apparatus 105.

In some examples, the display 140 may be a mechanical display that may convey a visual indication of the various parameters associated with the apparatus 105. As one example, the visual display 140 may be a fuse, a circuit breaker, a switch, and the like. The storage controller 120 may be configured to output information to the display 140 to activate at least a portion of the mechanical display based on operational aspects of the apparatus 105. For example, the storage controller 120 may send a signal to the display 140 to blow the fuse or change the position of a switch when the storage media 135 has been securely erased. In some embodiments, the mechanical display may be usable once, e.g., a traditional fuse, or may be reusable, e.g., a switch or an electronic fuse that can be reset and reused for a subsequent secure erasure.

As another example, the display 140 may be a chemical display where an electrically activated chemical indicator that maintains its state in the absence of power is used to visually indicate the status of various aspects of the data storage device.

Additional functions that may be provided by the storage controller 120 include, for example, functions related to storage and retrieval of data to/from the storage media 135. Such functions may include, for example, address translation/mapping, caching, wear-leveling operations, and encryption/decryption operations. Such functions may be implemented using any combination of hardware, software, and/or firmware. As mentioned above, storage controller 120 includes controller memory 130, which may include non-volatile memory, and which may also include volatile random access memory (RAM). The RAM may be used, among other things, to cache data read from or written to storage media 135, map logical to physical addresses, and store other operational data used by the controller processor 125 and other components of the apparatus 105.

The host computer 110 may also include a number of components, including one or more central processing units (CPUs) 145, input/output circuitry 150, and system memory 155. The host computer 110 may use the apparatus 105 as a lowest level of persistent storage, or the apparatus 105 may be acting as an intermediate level of cache for another layer of non-volatile storage (e.g., hard disk drive). The host computer 110 and apparatus 105 may be commonly coupled to a power supply (not shown), or may include separate power supplies/sources. Host computer 110 also includes non-volatile storage 160, and volatile cache 165 which may be used, for example, to store data as needed by the host computer 110. In some examples, the display functions of the apparatus 105 are configured to operate independently from the host computer 110, as is described in more detail below.

Figure 2:
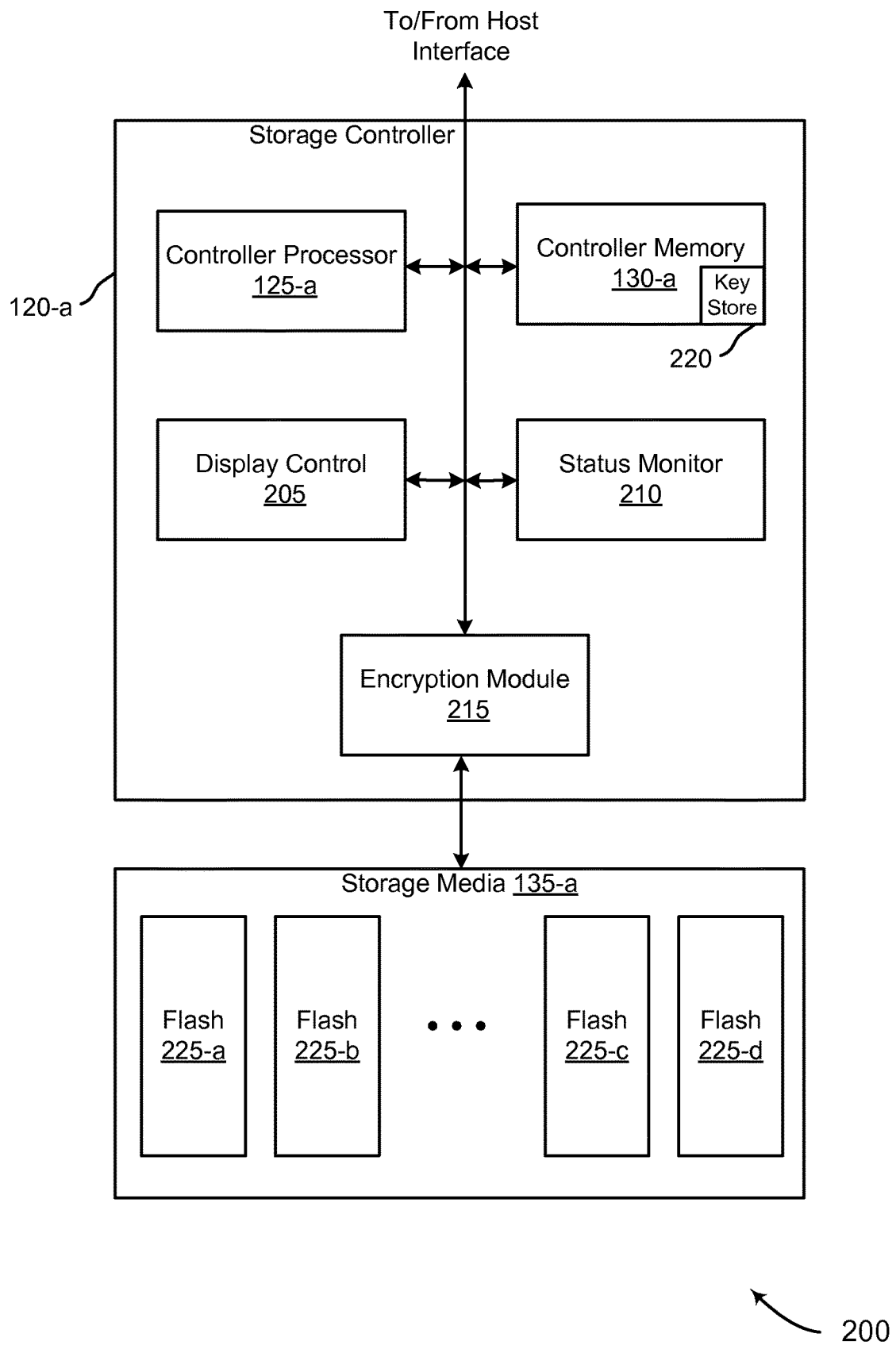
FIG. 2 is a block diagram representation of an example of a storage controller and storage media in accordance with various embodiments.

With reference now to FIG. 2, an example 200 of a storage controller 120-a and storage media 135-a is discussed. The storage controller 120-a and storage media 135-a may be examples of the storage controller 120 and storage media 135 of FIG. 1, for example. In this example, the storage controller 120-a may include controller processor 125-a, controller memory 130-a, a display control 205, a status monitor 210, and an encryption module 215. Each of the noted modules may be a means for performing one or more functions related to operation of the storage device. In some examples, each of the noted modules may be combined with the controller processor 125-a as one or more functional elements or sub-components.

The storage media 135-a, in some examples, may include non-volatile solid-state storage, such as one or more flash dies 225, which individually contain a portion of the total storage capacity of the apparatus 105. The memory contained within individual flash dies 225 may be further partitioned into blocks which may be referred to as erasure blocks/units. The erasure blocks represent the smallest individually erasable portions of the storage media 135-a. The erasure blocks in turn include a number of pages that represent the smallest portion of data that can be individually programmed and/or read. In a NAND configuration, for example, the page sizes may range from 512 bytes to 4 kilobytes (KB) and up, and the erasure block sizes may range from 16 KB to 512 KB and up. It will be appreciated that the present embodiments described herein are not limited to any particular size of the pages and blocks.

The display control 205 may operate or otherwise control one or more aspects of the information being displayed on the visual display of the data storage device. In some examples, the display control 205 may communicate with the controller processor 125-a, the controller memory 130-a, the status monitor 210, and/or the encryption module 215 to receive information associated with various aspects of the data storage device. Accordingly, the display control 205 may send one or more signals to the visual display to set, change, update, or otherwise cause information indicative of the aspects of the data storage device to be displayed. In some examples, the display control 205 may cause the display to show the various aspects in real-time, i.e., as the information is received from the noted components, or to be updated on a periodic schedule. When the visual display is a mechanical display, the display control 205 may send one or more signals to cause the physical components of the mechanical display to change.

The status monitor 210 may include, or communicate with, one or more components of the data storage device to determine and output information associated with the data storage device. In some examples, the status monitor 210 may output information indicative of an operational state of the data storage device. An operational state may include, but is not limited to, a workload status, a sensor status, an error condition, an operating hours status, a temperature status, and the like. Accordingly, the visual display of the operational state of the data storage medium may provide for improved and more convenient operation and maintenance activities associated with the data storage device.

The status monitor 210 may also monitor, control, or otherwise manage one or more aspects of determining a metric associated with a confidence level for security of the data storage device. The status monitor 210 may communication with the display control 205, for example, to direct the display to show a visual indication based on the security confidence metric. Generally, the security confidence metric may provide an indication of whether one or more components of the data storage device has been tampered with. In some examples, the security confidence metric may be determined in consideration of one or more of information stored on the storage media 135-a, information associated with a manufacturer of the data storage device, a model number associated with the data storage device, a version number or parameter associated with the data storage device, and the like. Accordingly, the status monitor 210 may determine whether a storage media 135-a and/or a storage controller 120-a has been changed (e.g., removed and replaced) by comparing the noted considerations with information previously stored, e.g., during manufacture. In some examples where the security confidence metric indicates tampering (e.g., the security confidence metric is below a threshold level), the status monitor 210 may communicate with one or more other components of the data storage device to disable certain functions, e.g., to disable a storage media 135-a.

As discussed above, in various embodiments, data may be encrypted by encryption module 215 using one or more encryption keys stored in a key store 220 in controller memory 130-a before being stored in storage media 135-a. Additionally or alternatively, key store 220 may be included in storage media 135-a.

Figure 3:
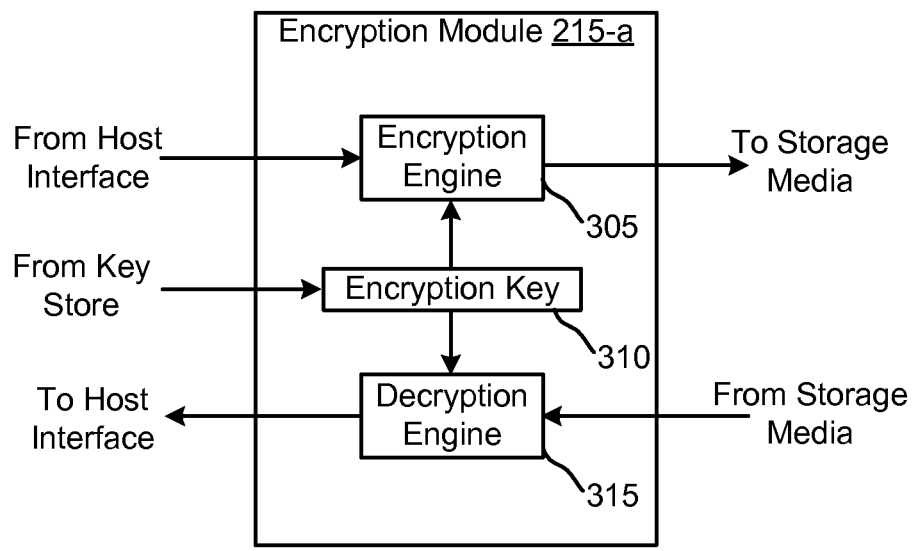
FIG. 3 is a block diagram representation of an encryption module in accordance with various embodiments.

With reference now to FIG. 3, a block diagram 300 illustrates an example of an encryption module 215-a according to various embodiments. Encryption module 215-a may be an example of encryption module 215 of FIG. 2, for example. The encryption module 215-a receives data from the host interface at encryption engine 305, and uses an encryption key 310 to perform an encryption algorithm on the data and output encrypted data to be stored in storage media. Likewise, decryption engine 315 may be used to decrypt data from the storage media and provide decrypted data to the host interface. Each of the noted modules/engines may be a means for performing one or more functions related to operation of the storage device.

Encryption key 310 may be formed from a root key, according to various embodiments. The root key may be stored in a re-writable storage location. Such a configuration for the encryption key 310 may be desirable because certain security standards, including the current version of the FIPS 140 standards, require methods to zeroize cryptographic keys that operate from within the boundaries of a cryptographic module. Methods for zeroizing may require the cryptographic key to be modifiable or erasable. In some examples, the root key may be stored in a one-time writable memory location that, when zeroized, overwritten, erased, etc., it may no longer be possible to store/retrieve encrypted data using the storage apparatus. Accordingly, in some examples, the encryption key 310 may be a modifiable or erasable root key and may be encrypted with an alterable root key.

In various examples, the encryption key 310 may be erased or otherwise modified to provide for an instant and secure erasure of the information being stored on the storage medium. That is, the encrypted data stored on the data storage medium may only be recoverable via decryption using the encryption key 310. Erasing the encryption key 310 or otherwise making it unavailable for use would prevent the stored data from being decrypted and, therefore being readable. Thus, the storage controller, for example, may securely erase the data or information stored on the storage medium by erasing the encryption key 310. Even if the stored information were recovered, it would be unreadable without the original encryption key 310. This technique may provide for an instantaneous method of securely erasing the data, rather than the more traditional and lengthy method of overwriting each memory block of the data storage medium.

Figure 4:
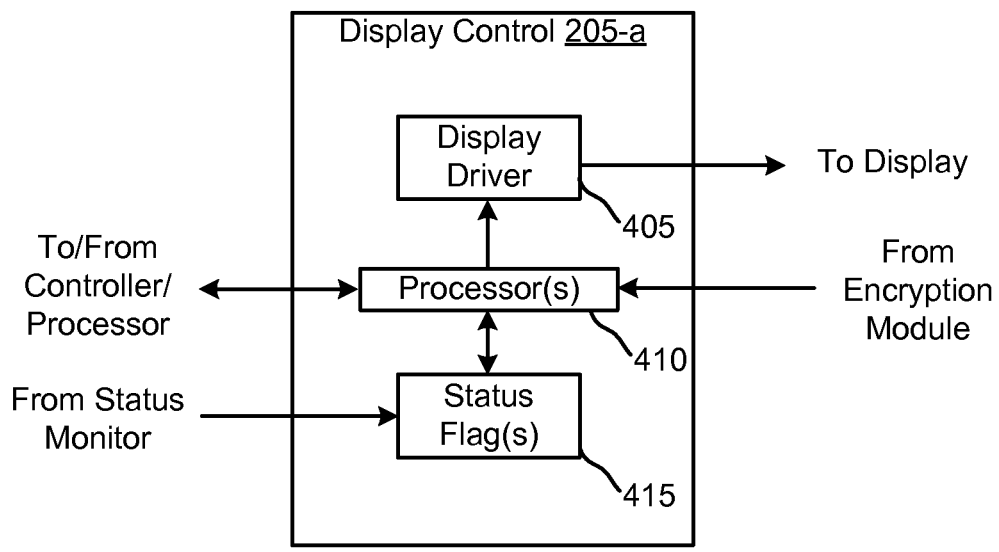
FIG. 4 is a block diagram representation of a display control in accordance with various embodiments.

With reference now to FIG. 4, a block diagram 400 illustrates an example of a display control 205-*a*. The display control 205-*a* may be an example of the display control 205 of FIG. 2, for example. In this example, display control 205-*a* includes a display driver 405, one or more processors 410, and a status flag 415. Each of these components may be in communication with the other via a bus, for example.

The display driver 405 may communicate with the processor(s) 410 and the visual display of the data storage device. As discussed above, the visual display may be e-paper where the information continues to be displayed once power is removed from the data storage device. In other examples, the visual display may be a mechanical display, e.g., a fuse or a switch, or a chemical display. The display driver 405 may receive information, commands, etc., from the processor 410 and output signal(s) to the visual display to cause the visual display to convey a visual indication based on the information received from the processor(s) 410.

The status flag(s) 415 may communicate with the processor(s) 410 and the status monitor. As is discussed on more detail below with reference to FIG. 5, the status monitor may output information associated with various parameters or operational conditions/states associated with the data storage device. The status flag(s) 415 may receive signal(s) from the status monitor indicative of such parameters or conditions and output information to the processor(s) 410 to convey the parameters or conditions.

The processor(s) 410 may communicate with the other components of the display control 205-*a* as well as the controller processor and the encryption module of the data storage device, e.g., the controller processor 125 and the encryption module 215 discussed above. In some examples, aspects of the processor 410 may be implemented as a functional component of the controller processor. The processor 410 may receive information, data, control signals, etc., and output signals to the display driver 405 based on the received information, data, and the like. In some examples, the processor 410 may also output time information to be displayed on the visual display. As one example, the processor 410 may determine when an event occurs, e.g., the data storage medium is securely erased, and output information indicative of the event date (day, month, year), time, etc., to be displayed on the visual display. Accordingly, a technician may view the display and immediately determine whether the data storage medium has been securely erased and also when the drive was securely erased.

In some examples, the processor 410 may reset or update the information displayed when additional information is written to the data storage medium. That is, the visual display may convey an indication that the data storage medium was securely erased based on information received from the controller processor and/or the encryption module, for example. When data is subsequently saved to the data storage medium of the data storage device, the processor 410 may receive a signal from the encryption module as a part of the encryption/storage functions discussed above. Accordingly, the processor 410 may output a signal to the display driver 405 to cause the display to remove the indication that the data storage medium has been securely erased.

In some examples, the processor 410 may output information to cause the visual display to show a unique number associated with the data storage medium. Displaying the unique number may provide for a secondary security measure (along with the display showing that the data storage medium has been securely erased) to confirm that the data storage medium has been securely erased. The unique number may be, in some examples, associated with a number located on a label or tag affixed on the enclosure of the data storage device. In other examples, the unique number may only be retrievable from a manufacturer as a step in the confirmation process that the data storage medium has been securely erased.

In some examples, the processor 410 may output information to cause the visual display to show a number that can be matched to a number previously written to the drive by the host computing system prior to the secure erase operation. The number may be stored in the controller memory 130 and/or the storage media 135 and communicated to the processor 410 during a secure erase operation. After the data storage medium has been securely erased, the data storage device may be placed into service again with additional data being encrypted and stored on the storage medium. In the subsequent use, a new number may be provided by the host computing system and displayed on the visual display once the data storage medium is securely erased a second time. Thus, this may provide for a visual indication of the secure erasure status of the drive and permit multiple reuse/secure-erase cycles.

It is to be understood that the components discussed above may be implemented as one or more components, in hardware, software, firmware, etc., of the apparatus 105. As one example, the controller memory 130 and/or the storage media 135 may store firmware instructions that when executed by the controller processor 125 may independently control the information being displayed on the visual display. Accordingly, the information displayed on the visual display may be controlled autonomously, e.g., without input or control, from the host computing system. The autonomous operation and control of the displayed information may provide, for example, a security mechanism to prevent incorrect information being displayed on the visual display. Consequently, a confidence level may be ascribed to the displayed information to meet various security standards, warranty compliance, etc.

Figure 5:
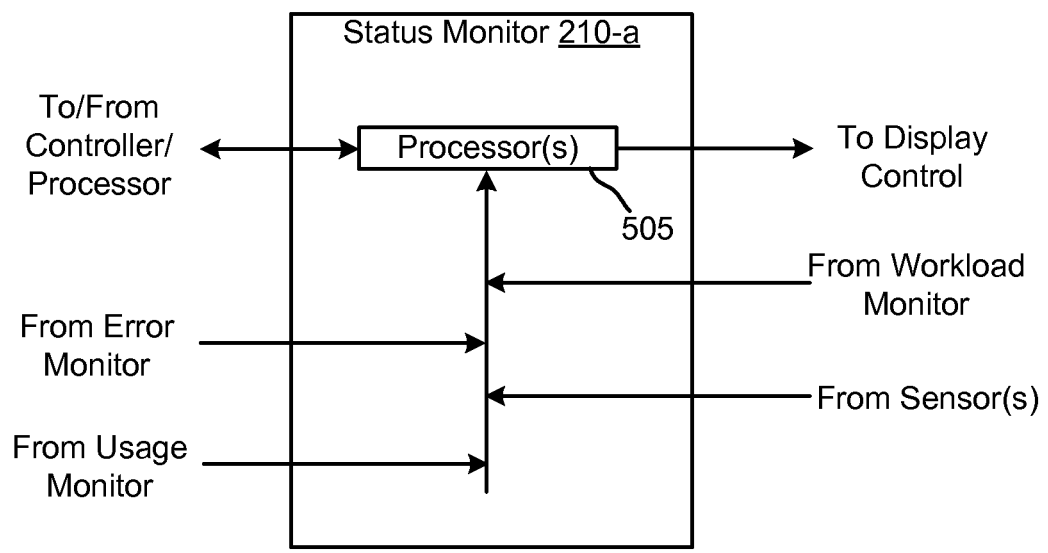
FIG. 5 is a block diagram representation of a status monitor in accordance with various embodiments.

FIG. 5 illustrates a block diagram 500 of an example of a status monitor 210-*a*. The status monitor 210-*a* may be an example of a status monitor 210 of FIG. 2 and may include one or more processor(s) 505. The processor 505 may communicate with, for example, the controller processor, the display control, error monitor, usage monitor, workload monitor, and one or more sensors associated with the data storage device. The noted inputs may provide for a visual indication of data storage device related information such as, but not limited to workload information. The workload information may include information indicative of how much workload the drive has been exposed to. The workload information may, for example, provide information associated with whether the data storage device is close to its warranty limit or has passed its warranty. As one example, the workload information may be provided using self-monitoring, analysis and reporting (SMART) logging technology.

The error monitor input may include, but is not limited to, a motion sensor input. The error monitor input may provide an indication of the shock and vibration induced to the data storage device. Other error monitor inputs that may also be considered are read errors, write errors, seek errors, a healthy or failed status for individual platters and heads, and the like. The sensor input may include information associated with one or more sensors of the data storage device. Exemplary sensors may include a temperature sensor, a humidity sensor, shock and vibration sensors, and the like.

The usage input may include information associated with the use of the data storage device. For example, usage input may include information indicative of a state of wear-out of the data storage device relative to its expected end of life. This may be useful for a SSD, for example, where the storage medium supports a finite number of write/erase cycles. This information may also be helpful for other storage mediums, e.g., HDD, that has limits either on the number of write operations or the number of read operations that can be supported. Other usage input information may include the number of power-on hours of use of the data storage device, the revision level of the microcode on the data storage device, and the like.

Generally, the above described inputs may be utilized to reduce the maintenance and the support time of a data storage device. The processor 505 may receive the inputs and output information, or an index associated with the information, to the display control to cause the visual display to show the appropriate information.

Figure 6A:
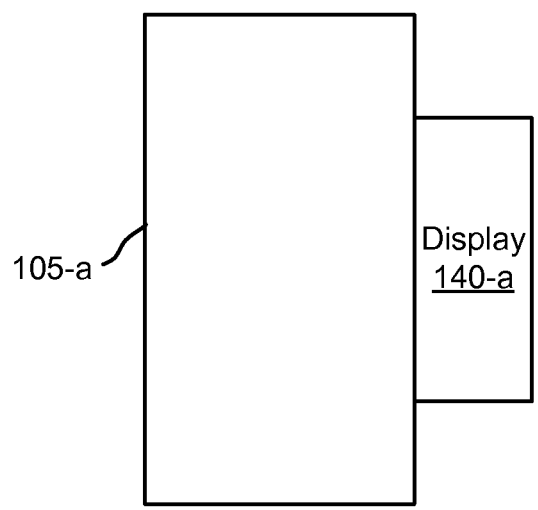
FIGS. 6A and 6B are block diagram representations of a memory apparatus in accordance with various embodiments.
Figure 6B:
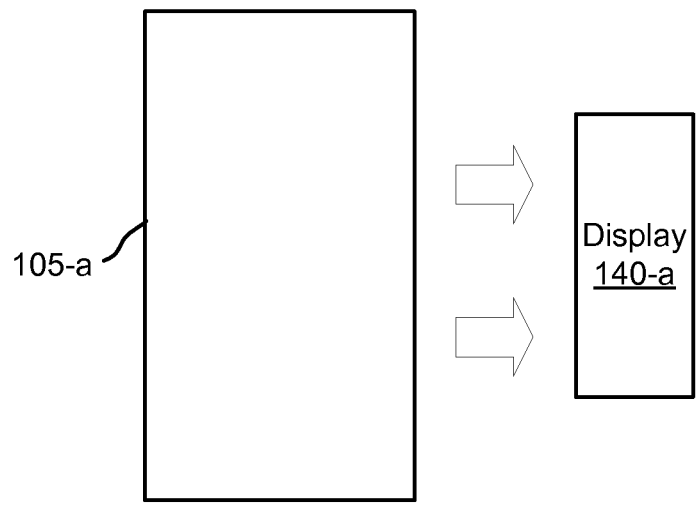

FIGS. 6A and 6B illustrate block diagrams 600 of an example of a memory apparatus 105-a. The apparatus 105-a and the display 140-a may be examples of the apparatus 105 and display 140, respectively, described with reference to FIG. 1. For example, the apparatus 105-a may include a host interface, a storage controller, a storage media, such as described with reference to any of FIGS. 1-5. Generally, the diagrams 600 illustrate one or more aspects related to the display 140-a being removable from the apparatus 105-a.

For example, diagram 600-a illustrates the display 140-a connected to the apparatus 105-a, such as during normal use. The display 140-a may be connected to the apparatus 105-a such that it is removable, e.g., using one or more screws, temporary adhesives, temporary fasteners, etc. The display 140-a may include, in some examples, a mounting structure or frame configured to be connectable and removable from the apparatus 105-a. Typically, an apparatus 105-a would otherwise include a pre-printed sticker on an outside cover conveying information such as the manufacturer of the apparatus 105-a, model number, versioning information, storage capacity, etc. In some examples, the display 140-a may supplant the pre-printed sticker and convey such information and more. The display 140-a may be in electronic communication with the apparatus 105-a (e.g., a storage controller) via one or more buses, cables, etc., to exchange various data, control information, etc.

In some examples, the apparatus 105-a may include a cover plate and the display 140-a may be connected or mounted on a cover plate. The cover plate may be removable such that it can be returned to a manufacturer for warranty purposes, for example. In other examples, the display 140-a may be mounted to the cover plate of the apparatus 105-a and be removable from the cover plate. The display 140-a may be removable from the cover plate and returned to the manufacturer, for example. Accordingly, one or more aspects of the apparatus 105-a, e.g., the display 140-a, may be recyclable and/or reusable and can be connected to a new data storage device and placed into operation again.

Diagram 600-b illustrates the display 140-a removed from the apparatus 105-a, such as during maintenance and/or when being returned to the manufacturer to provide verification that the apparatus 105-a has been destroyed. As discussed, the display may be connected to the cover plate of the apparatus 105-a where the cover plate can be removed and/or just the display 140-a can be removed from the apparatus 105-a. As discussed above, the information shown on the display 140-a may continue to be displayed when the display 140-a is removed from the apparatus 105-a. Accordingly, the display 140-a may, when removed, continue to display various operational parameters associated with the data storage device, manufacturer and identification information for the data storage device, an indication of whether the data storage device has been securely erased, an indication of the security confidence metric for the data storage device, etc. Accordingly, when the display 140-a is removed from the apparatus 105-a, a technician, manufacturer, etc., may readily confirm the information displayed on the display 140-a.

Figure 7:
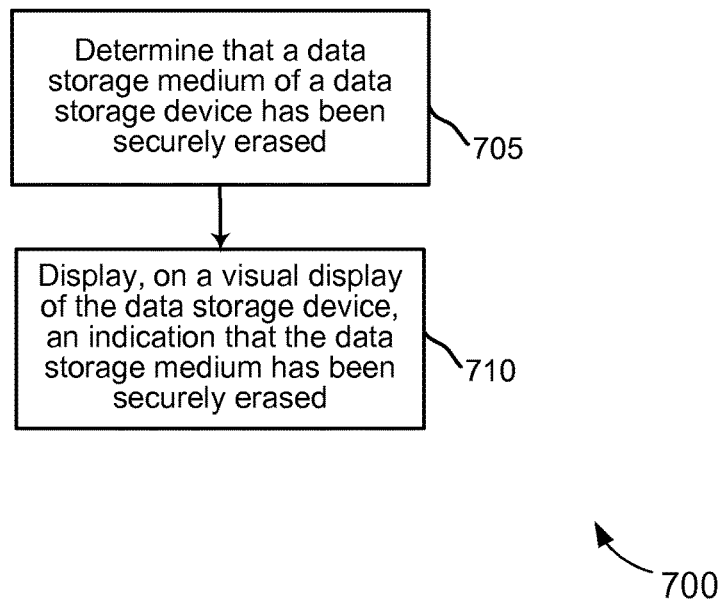
FIG. 7 is a flowchart illustration of the operational steps of a method for providing a visual indication on a data storage device in accordance with various embodiments.

FIG. 7 is a flowchart of a method 700 for displaying a secure erasure status on a data storage device according to various embodiments. For clarity, the method 700 is described below with reference to aspects of one or more of the data storage apparatus 105, storage controller 120, controller processor 125, and/or other components described with reference to FIGS. 1, 2, 3, 4, 5, 6A and/or 6B. In one implementation, a storage controller 120, or a processor module thereof, may execute one or more sets of codes to control the functional elements of the device to perform the functions described below.

At block 705, the device may determine that a data storage medium of a data storage device has been securely erased. The device may determine that the data storage medium has been securely erased by determining whether an encryption key has been erased. At block 710, the device may display, in a visual display of the data storage device, an indication that the data storage medium has been securely erased. For example, the device may display "ISE" to indicate that the data storage medium has been securely erased using an instant secure erase procedure where the encryption key is erased. Additionally or alternatively, the device may display one or more numbers associated with the data storage device as a security component of the ISE procedure.

Figure 8:
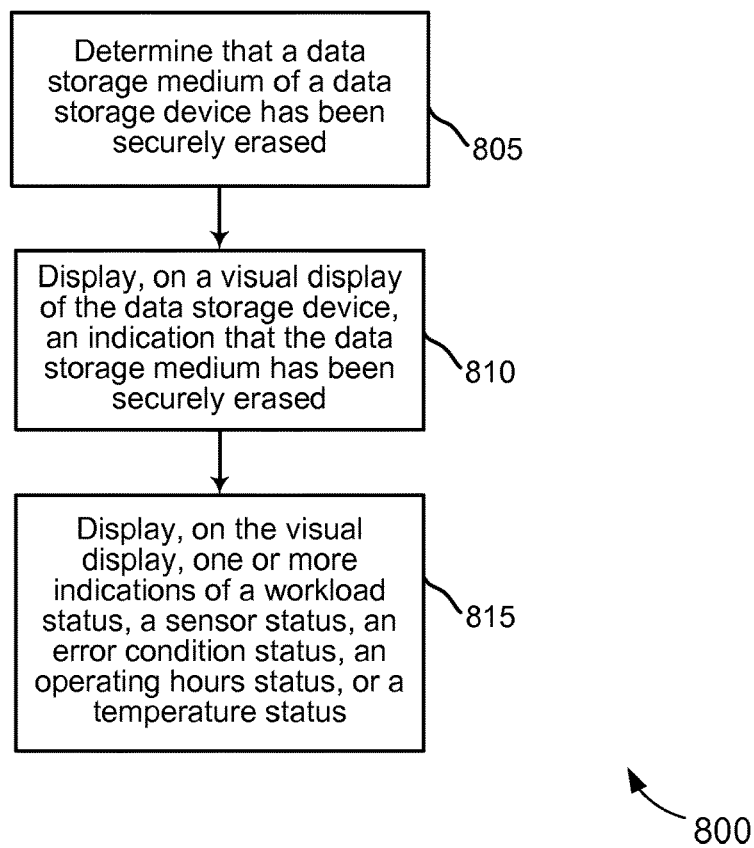
FIG. 8 is a flowchart illustration of the operational steps of a method for providing a visual indication on a data storage device in accordance with various embodiments.

FIG. 8 is a flowchart of a method 800 for displaying information on a data storage device according to various embodiments. For clarity, the method 800 is described below with reference to aspects of one or more of the data storage apparatus 105, storage controller 120, controller processor 125, and/or any other components described with reference to FIGS. 1, 2, 3, 4, 5, 6A and/or 6B. In one implementation, a storage controller 120, or a processor module thereof, may execute one or more sets of codes to control the functional elements of the device to perform the functions described below.

At block 805, the device may determine that a data storage medium of a data storage device has been securely erased. The device may determine that the data storage medium has been securely erased by determining whether an encryption key has been erased. At block 810, the device may display, in a visual display of the data storage device, an indication that the data storage medium has been securely erased. For example, the device may display "ISE" to indicate that the data storage medium has been securely erased using an instant secure erase procedure where the encryption key is erased. Additionally or alternatively, the device may display one or more numbers associated with the data storage device as a security component of the ISE procedure.

At block 815, the device may display, on the visual display, one or more indications of a workload status, a sensor status, an error condition status, an operating hours status, or a temperature status. The additional displayed information may provide an indication of past and/or current operational conditions and/or states of the data storage device. The additional displayed information may provide input for various maintenance and/or warranty features associated with the data storage device.

Figure 9:
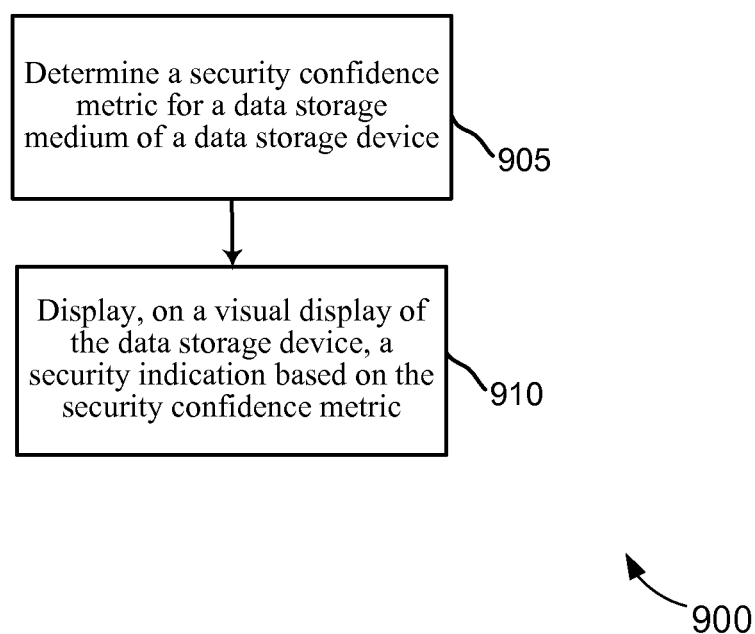
FIG. 9 is a flowchart illustration of the operational steps of a method for providing a visual indication on a data storage device in accordance with various embodiments.

FIG. 9 is a flowchart of a method 900 for displaying a secure confidence metric on a data storage device according to various embodiments. For clarity, the method 900 is described below with reference to aspects of one or more of the data storage apparatus 105, storage controller 120, controller processor 125, and/or other components described with reference to FIGS. 1, 2, 3, 4, 5, 6A and/or 6B. In one implementation, a storage controller 120, or a processor module thereof, may execute one or more sets of codes to control the functional elements of the device to perform the functions described below.

At block 905, the device may determine a security confidence metric for a data storage device. The security confidence metric may provide an indication of whether the data storage device has been compromised, tampered with, or otherwise altered. The security confidence metric may be determined based on confirming various parameters associated with the data storage device, e.g., a manufacturer, a model number, a version number, a storage capacity, a manufacturer security code associated with the data storage device, and the like. In some examples, the security confidence metric may additionally or alternatively be determined based on one or more operational parameters associated with the data storage device, e.g., minimum/maximum exposure temperature, a read/write threshold count, etc. Accordingly, the security confidence metric may provide an indication of whether a data storage medium of the data storage device has been replaced, whether the data storage device has been misused, and the like.

At block 910, the device may display, on a visual display of the data storage device, a security indication based on the security confidence metric. For example, if the security confidence metric is above a threshold level, the device may display an indication confirming the data storage device has not been compromised, misused, etc. For example, a text word or phrase, an icon, a background color, etc., ma be selected and used to display the indication on the visual display. If, however, the security confidence metric is below the threshold level, the device may display an indication that the data storage device has been compromised. For example, a warning text word or phrase, icon, etc., may be displayed on the visual display to convey the indication.

Figure 10:
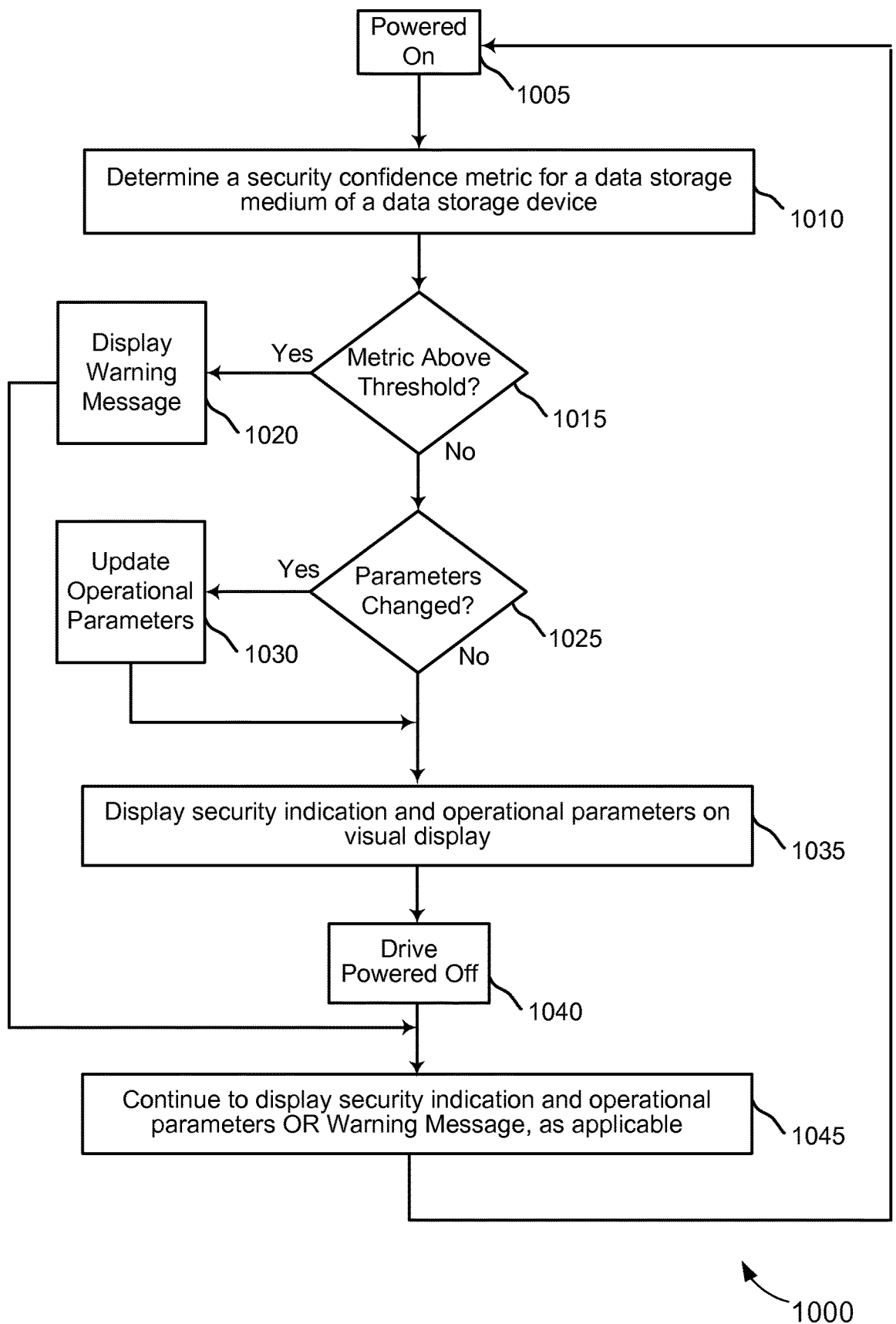
FIG. 10 is a flowchart illustration of the operational steps of a method for providing a visual indication on a data storage device in accordance with various embodiments.

FIG. 10 is a flowchart of a method 1000 for displaying a secure confidence metric on a data storage device according to various embodiments. For clarity, the method 1000 is described below with reference to aspects of one or more of the data storage apparatus 105, storage controller 120, controller processor 125, and/or other components described with reference to FIGS. 1, 2, 3, 4, 5, 6A and/or 6B. In one implementation, a storage controller 120, or a processor module thereof, may execute one or more sets of codes to control the functional elements of the device to perform the functions described below.

At block 1005, the device may be powered on. For example, the device may be initially installed in the data storage device or may have power applied by a user. At block 1010, the device may determine a security confidence metric for a data storage device. The security confidence metric may provide an indication of whether the data storage device has been compromised, tampered with, misused (e.g., operated outside of its normal operating parameters), etc. At 1015, the device may determine whether the security confidence metric is above or below a threshold level. As one non-limiting example, one or more of the features described herein that may be considered when determining the security confidence metric may be assigned a value of "0" when the feature has not been exceeded, e.g., when the data storage medium has not been replaced, or a value of "1" when the feature has been exceeded. Determining the security confidence metric may include identifying if one, or more than one of the considered features are assigned a value of 1 (e.g., a flag has been set for that feature). The threshold level may be set to 1, 2, or some other number as appropriate to determine when the data storage device has been compromised in any way. Accordingly and at block 1020 where the security confidence metric is above the threshold level, the device may display a warning message on the visual display. The warning message may be a text warning, an icon warning, changing the background color, etc.

At block 1025 when the security confidence metric is below the threshold level, the device may determine if one or more operational parameters of the data storage device have changed. For example, the operations parameter may include, but are not limited to, available or free storage capacity, read/write cycles, etc. In some examples, the operational parameters may have changed due to one or more SMART technology functions. For example, if one or more portions of the data storage medium is corrupted and removed from service by a monitoring function, this may reduce the total storage capacity of the data storage device. Accordingly, the operational parameter associated with total storage capacity may have changed.

At block 1030 when one or more operational parameters have changed, the device may update the operational parameters. For example, the device may store the operational parameters in a volatile and/or non-volatile storage medium, e.g., in firmware, of the data storage device and update the stored operational parameter accordingly. At block 1035 when the operational parameters have not changed, the device may display, on a visual display of the data storage device, a security indication based on the security confidence metric. For example, if the security confidence metric is below a threshold level, the device may display an indication confirming the data storage device has not been compromised, misused, etc. If, however, the security confidence metric is above the threshold level, the device may display an indication that the data storage device has been compromised, e.g., a warning message.

At block 1040, the device may be powered off. For example, a user may remove power from the host computing system, may remove the data storage medium from the host computing system, may remove power from the data storage device, and the like. At block 1045, the device may continue to display the security indication and operational parameters on the visual display. Additionally or alternatively, the device may display the warning message on the visual display indicating that the security confidence metric is above the threshold. The device may continue to display the information until it is once again powered on at block 1005.

The foregoing description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, such as a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method, comprising:
   receiving, by a storage controller of a data storage device, a value generated by a host computing system of the data storage device, the value being uniquely associated with the data storage device to confirm that the data storage medium has been securely erased, the storage controller being a hardware storage controller, the host computing system being external to the data storage device;
   storing, by the storage controller, the value in a controller memory of the storage controller;
   storing, by the storage controller, a portion of an encryption key in the controller memory;
   encrypting, by the storage controller using the encryption key, data from the host computing system and storing the encrypted data to at least one data storage medium of the data storage device;
   zeroizing, by the storage controller, the portion of the encryption key stored in the controller memory;
   verifying, by the storage controller, the portion of the encryption key is zeroized;
   determining, by the storage controller, a security confidence metric for the at least one data storage medium of the data storage device;
   upon verifying the portion of the encryption key is zeroized, retrieving, by the storage controller, the value from the controller memory; and
   displaying, on a visual display of the data storage device, a security indication based on the security confidence metric, the security indication including the value and an indication that the at least one data storage medium is securely erased.

2. The method of claim 1, wherein determining the security confidence metric comprises:
   determining, based at least in part on information stored on the at least one data storage medium, an identification of the data storage device, a manufacturer of the data storage device, a model parameter associated with the data storage device, a version parameter associated with the data storage device, or combinations thereof.

3. The method of claim 1, wherein displaying the security indication comprises:
   displaying a warning message indicating that the data storage device has been compromised when the security confidence metric is above a threshold level.

4. The method of claim 3, wherein the data storage device being compromised comprises:
   determining that the at least one data storage medium of the data storage device has been removed, replaced, tampered with, or any combination thereof.

5. The method of claim 3, further comprising:
   disabling the data storage device.

6. The method of claim 1, wherein the security confidence metric is determined by executing firmware instructions by a processor of the data storage device.

7. The method of claim 1, further comprising:
   displaying one or more operational parameters on the visual display when the security confidence metric is below a threshold level.

8. The method of claim 7, wherein the operational parameters comprise one or more indications of a drive capacity, workload status, a sensor status, an error condition status, an operating hours status, or a temperature status.

9. The method of claim 1, wherein the indication is displayed on the visual display without an operating voltage being applied to the data storage device.

10. The method of claim 9, wherein the visual display is an electronic-paper display.

11. An apparatus, comprising:
    a data storage device configured to be mounted within a processing system, the data storage device comprising:

at least one data storage medium configured to store data;

a storage controller to receive a value generated by a host computing system of the data storage device, the value being uniquely associated with the data storage device to confirm that the data storage medium has been securely erased; store the value in a controller memory of the storage controller; store a portion of an encryption key in the controller memory; encrypt, using the encryption key, data from the host computing system and storing the encrypted data to the at least one data storage medium of the data storage device; zeroize the portion of the encryption key stored in the controller memory; verify the portion of the encryption key is zeroized; determine a security confidence metric for the at least one data storage medium of the data storage device; and upon verifying the portion of the encryption key is zeroized, retrieve the value from the controller memory, the storage controller being a hardware storage controller, the host computing system being external to the data storage device; and a visual display configured to display a security indication based on the security confidence metric, the security indication including the value and an indication that the at least one data storage medium is securely erased.

12. The apparatus of claim 11, wherein the visual display is removable and configured to display the information associated with the data storage device when removed, and wherein the visual display is attached to an external surface of a cover plate of the data storage device, and the cover plate is removable from the data storage device.

13. The apparatus of claim 11, wherein the visual display is attached to an external surface of a cover plate of the data storage device, and the visual display is removable from the cover plate.

14. The apparatus of claim 11, wherein the information associated with the data storage device that is displayed when the visual display is removed comprises a security indication associated with a security confidence metric for the data storage device.

15. The apparatus of claim 14, wherein the information associated with the security confidence metric comprises information indicating whether the at least one data storage medium of the data storage device has been removed, replaced, tampered with, or any combination thereof.

16. The apparatus of claim 14, wherein the information associated with the security confidence metric comprises information indicative of an identification of the data storage device, a manufacturer of the data storage device, a model parameter associated with the data storage device, a version parameter associated with the data storage device, or combinations thereof.

17. The apparatus of claim 14, wherein the data storage device further comprises:

a processor executing firmware instructions stored on the at least one data storage medium to control the information being displayed on the visual display and to determine the security indication.

18. The apparatus of claim 11, wherein the visual display is an electronic-paper display configured to display the information associated with the data storage device without an operating voltage being applied to the data storage device.

19. An apparatus, comprising:

a data storage device comprising:

at least one data storage medium configured to store data;

a storage controller to receive a value generated by a host computing system of the data storage device, the value being uniquely associated with the data storage device to confirm that the data storage medium has been securely erased; store the value in a controller memory of the storage controller; store a portion of an encryption key in the controller memory; encrypt, using the encryption key, data from the host computing system and storing the encrypted data to the at least one data storage medium of the data storage device; zeroize the portion of the encryption key stored in the controller memory; verify the portion of the encryption key is zeroized; determine a security confidence metric for the at least one data storage medium of the data storage device; and upon verifying the portion of the encryption key is zeroized, retrieve the value from the controller memory, the storage controller being a hardware storage controller, the host computing system being external to the data storage device; and a visual display configured to display a security indication based on the security confidence metric, the security indication including the value and an indication that the at least one data storage medium is securely erased.

20. The apparatus of claim 19, wherein the visual display is removable and configured to display the information associated with the data storage device when removed, and wherein the visual display is attached to an external surface of a cover plate of the data storage device, and the cover plate is removable from the data storage device.

* * * * *